United States Patent [19]

Kwon et al.

[11] Patent Number: 5,751,075
[45] Date of Patent: May 12, 1998

[54] MAGNET ASSEMBLY FOR LINEAR MOTOR

[75] Inventors: Byoung Ha Kwon, Seoul; Hyeong Kook Lee, Kyungki-do, both of Rep. of Korea

[73] Assignee: L.G. Electronics Inc., Seoul, Rep. of Korea

[21] Appl. No.: 744,175

[22] Filed: Nov. 5, 1996

[30]    Foreign Application Priority Data

Nov. 14, 1995 [KR]  Rep. of Korea ............... 41153/1995

[51] Int. Cl.$^6$ ............................................ H02K 41/00
[52] U.S. Cl. ............................................ 310/12; 310/190
[58] Field of Search ........................... 310/12, 13, 14, 310/15, 30, 190

[56]               References Cited

U.S. PATENT DOCUMENTS

| 4,475,051 | 10/1984 | Chai et al. | 310/49 |
| 4,827,163 | 5/1989 | Bhate et al. | 310/15 |
| 5,495,131 | 2/1996 | Goldie et al. | 310/12 |

*Primary Examiner*—Steven L. Stephan
*Assistant Examiner*—Judson H. Jones
*Attorney, Agent, or Firm*—Ostrolenk, Faber, Gerb & Soffen, LLP

[57]               ABSTRACT

A linear motor magnet assembly which is capable of facilitating the assemblage and enhancing the reliability thereof by attaching magnets on a cylindrical magnet shell to form a magnet assembly, and which includes the cylindrical magnet shell, and a plurality of magnets attached on a peripheral surface of the magnet shell.

8 Claims, 4 Drawing Sheets

5,751,075

MAGNET ASSEMBLY FOR LINEAR MOTOR

BACKGROUND OF THE INVENTION

1. Field of the Invention

The present invention relates to a linear motor magnet assembly, and in particular, to an improved linear motor magnet assembly which is capable of facilitating the assemblage and enhancing the reliability thereof by attaching a magnet on a single cylindrical magnet shell to form a magnet assembly.

2. Description of the Prior Art

As shown in FIGS. 1A and 1B, in a conventional linear motor, a first silicon steel lamination 7 and a second silicon steel lamination 8 having a coil 9 therein are provided with a predetermined space therebetween.

A base ring 3 connected to a piston (not illustrated) is disposed in the space between the first and second silicon steel laminations 7 and 8, and an end ring 4 is disposed below in the lower portion of the base ring 3.

A plurality of magnets 2 are provided between the base ring 3 and the end ring 4 in a cylindrical form.

Here, the base ring 3 and end ring 4 are fastened together by long thin bolts 5 and nuts 6 to support the magnets 2 therebetween.

Described in more detail, the bolts 5 penetrate the end ring 4, pass through gaps between the magnets 2, then penetrates the base ring 3, and are fastened with the nuts 6 on the upper portion of the base ring 3 to support the magnets 2.

Reference numeral 6a represents a spring washer.

The above-described linear motor constructed according to the conventional art is operated as a magnet assembly 1 including the base ring 3, the end ring 4 and the magnets 2 to reciprocate between the first and second silicon steel laminations 7 and 8.

However, in the conventional magnet assembly 1, it is not easy to form holes (not illustrated) for inserting the bolts 5 into the thin base ring 3 and end ring 4, and the strength of the base ring 3 and the end ring 4 having holes formed thereon is so weak that the rings 3 and 4 are easily damaged.

Further, the elements of the magnet assembly 1 such as the bolts 5, the nut 6, and the spring washer 6a are so many that the assemblage is disadvantageously complicated, difficult and time-consuming, and since the thin end ring and base ring are easily damaged during assembly or the use, the magnets 2 are often damaged.

SUMMARY OF THE INVENTION

Accordingly, it is an object of the present invention to provide a linear motor magnet assembly in which the assemblage is made easy and the reliability of the assembly is enhanced by making the structure for mounting the magnets simple.

To achieve the above object, there is provided an improved linear motor magnet assembly which includes a single cylindrical magnet shell, and a plurality of magnets attached on a peripheral surface of the magnet shell.

To achieve the above object, there is also provided an improved linear motor magnet assembly which includes a single cylindrical magnet shell, and a plurality of magnets attached on an outer surface of the magnet shell, a fixed folded ring having an outwardly curled portion formed at a lower circular edge of the magnet shell to fix one end of the magnets, and a fixed ring mounted on a peripheral surface of the magnet shell to fix the other end of the magnets.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The linear motor magnet assembly according to the present invention will now be described in detail with reference to the accompanying drawings.

Figure 1A:
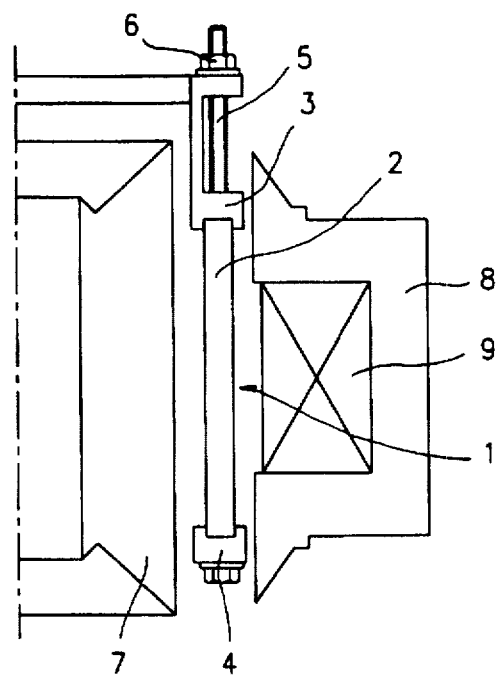
FIG. 1A is a cross-sectional view showing the structure of a linear motor having a magnet assembly according to the conventional art.
Figure 1B:
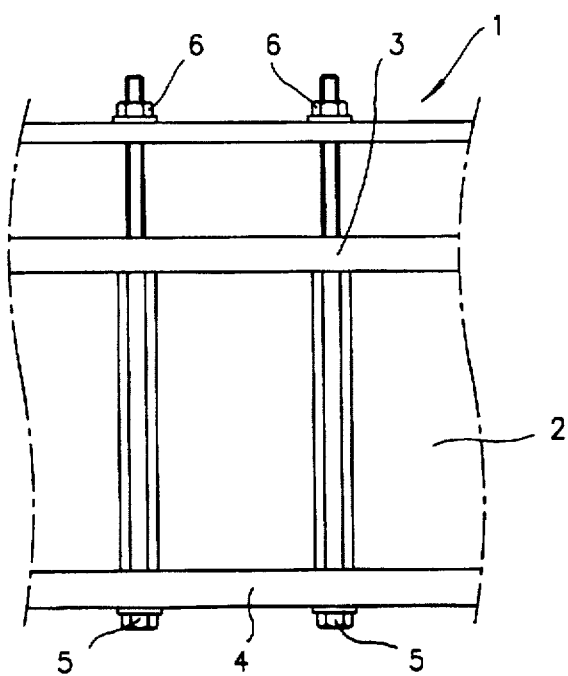
FIG. 1B is a development view showing the magnet assembly according to the conventional art.
Figure 2A:
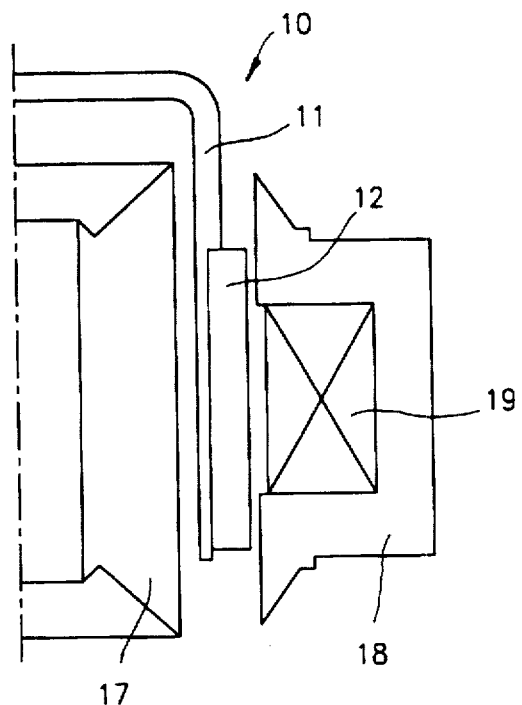
FIG. 2A is a cross-sectional view showing the structure of a linear motor having a magnet assembly according to an embodiment of the present invention.
Figure 2B:
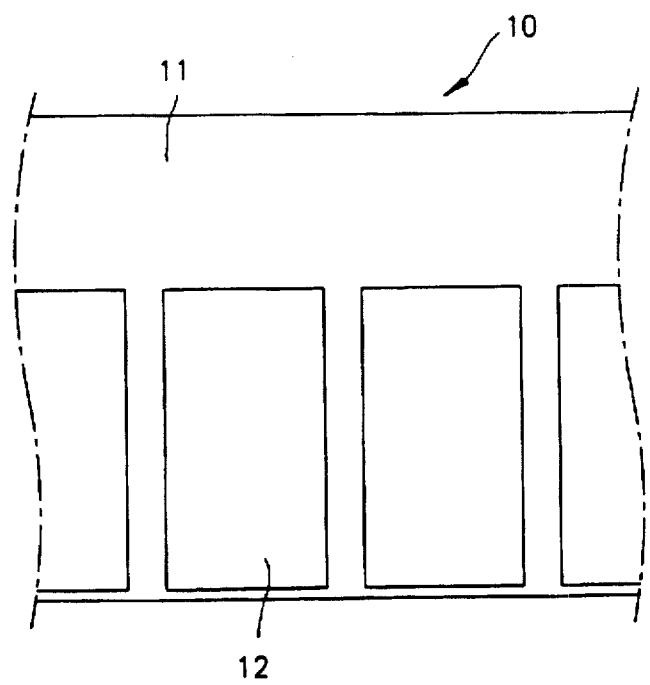
FIG. 2B is a development view showing the magnet assembly according to the present invention.

As shown in FIGS. 2A and 2B, in a magnet assembly 10 for a linear motor according to the present invention, a cylindrical magnet shell 11 connected to a piston (not illustrated) is disposed between first silicon steel laminations 17 and second silicon steel laminations 18.

On a peripheral surface of the magnet shell 11, a plurality of magnets 12 are attached to constitute the magnet assembly 10.

Here, the magnet shell 11 is composed of non-magnetic material.

In the linear motor magnet assembly 10 having the above structure according to the present invention, the embodiment wherein the magnets 12 are attached to the exterior of the magnet shell 11 will be described as follows.

First, as shown in FIGS. 2A and 2B, the magnet assembly 10 for a linear motor according to an embodiment of the present invention includes the magnet shell 11 on a peripheral surface of which a predetermined portion is recessed for attaching the magnets 12 by inserting same thereonto, and a plurality of magnets 12 are attached on the magnet shell 11 by a bonding.

Figure 3A:
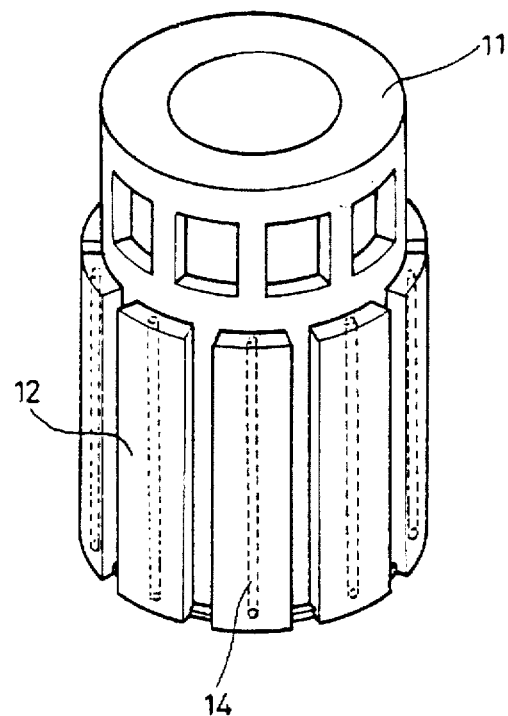
FIG. 3A is a perspective view showing the through slits provided in the magnet assembly according to the present invention.
Figure 3B:
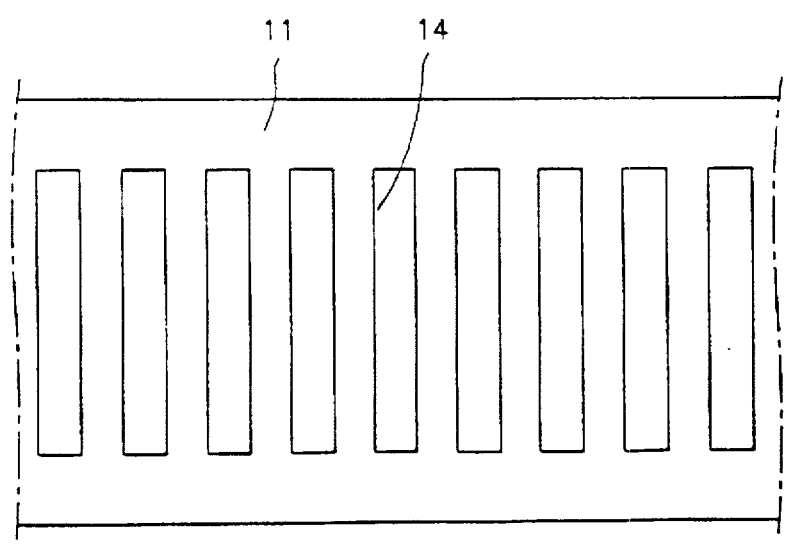
FIG. 3B is a cross-sectional view showing the through slit provided in the magnet assembly according to the present invention.

In the linear motor magnet assembly, as shown in FIGS. 3A and 3B, a plurality of through slits 14 are formed in portions of the magnet shell 11 where the plurality of magnets 12 are to be attached, along the peripheral surface of the magnet shell 11.

Accordingly, a loss resulting from an eddy current generated by the magnet shell 11 can be reduced due to the through slits 14, and the weight of the magnet shell 11 can also be decreased.

According to another embodiment of the present invention, unlike in FIG. 3A, the plurality of through slits 14 may be formed in portions along the peripheral surface of the magnet shell 11 where the plurality of magnets 12 are not attached.

Figure 4:
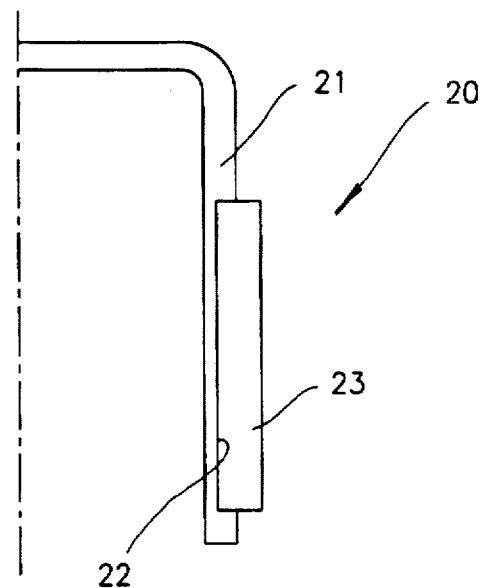
FIG. 4 is a cross-sectional view showing the structure of a magnet assembly according to another embodiment of the present invention.

As shown in FIG. 4, a magnet assembly 20 for a linear motor according to another embodiment of the present invention includes a magnet shell 21 in which a plurality of fixing recesses 22 are formed to firmly insert magnets 23 into a predetermined portions of the peripheral surface of the magnet shell 21, and a plurality of magnets 23 are closely attached in the fixing recesses 22.

Then, since the magnets 23 are inserted to be attached into the plurality of fixing recesses 22 formed having a predetermined depth, the magnets 23 can be attached on the correct positions, and as a result, the strength of the attachment can be enhanced.

Figure 5:
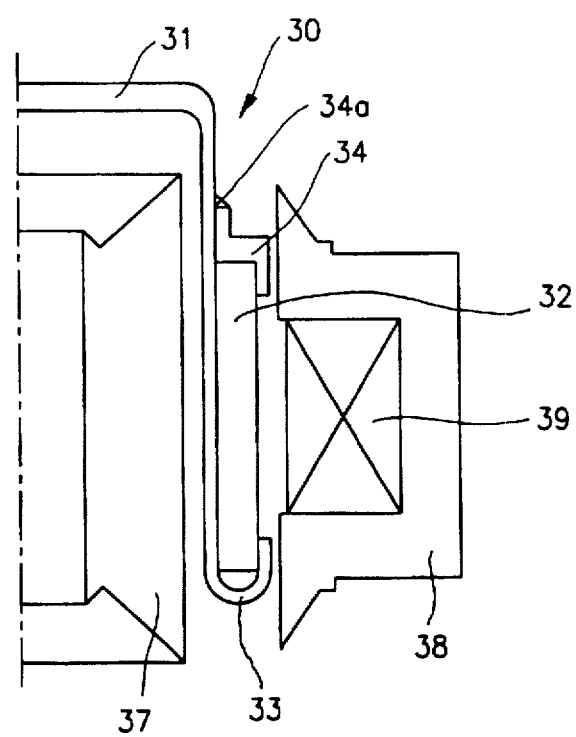
FIG. 5 is a cross-sectional view showing a linear motor having a magnet assembly according to a third embodiment of the present invention.

As shown in FIG. 5, a magnet assembly 30 for a linear motor according to a third embodiment of the present invention includes a plurality of magnets 32 attached on a peripheral surface of a single cylindrical magnet shell 31, and a fixed folded ring 33 having an outwardly curled portion is formed at a lower circular edge of the magnet shell 31 to fix one end of the magnets 32.

On the upper end of the peripheral portion of the magnet shell 31, a fixing ring 34 is attached by welding to fix the other ends of the magnets 32.

Then, the fixed folded ring 33 and the fixing ring 34 attach the magnet 32 on the peripheral surface of the magnet shell 31 with each end portion of the magnets 32 enclosed by a predetermined length.

The fixing ring 34 is preferably attached by welding to the peripheral surface of the magnet shell 31, but it may be attached in a different way.

Reference numeral 37 represents a first silicon steel lamination, 38 a second silicon steel lamination, 39 a coil, and 34a a weld.

As described in detail above, the linear motor magnet assembly does not employ bolt and nuts which have been used in the conventional art, and thereby the simplified comprising elements result in the excellent assemblage character, and since the magnets are attached to the magnet shell formed in a single cylindrical shape, the strength of the magnet assembly is increased so that the reliability of the product is enhanced.

Further, since a plurality of through slits are formed in the peripheral surface of the magnet shell, losses resulting from eddy currents generated when the linear motor is operated can be reduced, and the weight of the magnet shell can also be effectively reduced.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A magnet assembly for a linear motor, comprising:

a cylindrical magnet shell;

a plurality of magnets attached by bonding on a peripheral surface of the magnet shell, wherein said magnets are attached on a plurality of through-slits formed in the peripheral surface of said magnet shell, and said through-slits are formed in portions along the peripheral surface of the magnet shell where the plurality of magnets are attached.

2. A magnet assembly for a linear motor, comprising:

a cylindrical magnet shell;

a plurality of magnets attached on a peripheral surface of the magnet;

the plurality of magnets are attached by bonding on the peripheral surface of the magnet shell;

a plurality of through holes are formed in the peripheral surface of the magnet shell; and the plurality of through holes are formed in portions along the peripheral surface of the magnet shell where the plurality of magnets are not attached.

3. The assembly of claim 1, wherein the plurality of magnets are respectively attached in a plurality of recesses formed in an exterior surface of the magnet shell.

4. A magnet assembly for a linear motor, comprising:

a cylindrical magnet shell;

a plurality of magnets attached on a peripheral surface of the magnet shell;

a fixed folded ring having an outwardly curled portion formed at a lower circular edge of the magnet shell to fix one end of the magnets; and a fixing ring joined to a peripheral portion of the magnet shell to fix the other end of the magnets.

5. The assembly of claim 4, wherein the fixing ring is attached by welding on an upper peripheral surface of the magnet shell.

6. The assembly of claim 4, wherein a plurality of through slits are formed in the peripheral surface of the magnet shell.

7. The assembly of claim 4, wherein the plurality of through slits are formed in portions along the peripheral surface of the magnet shell where the plurality of magnets are attached.

8. The assembly of claim 7, wherein the plurality of through holes are formed in portions along the peripheral surface of the magnet shell where the plurality of magnets are not attached.

* * * * *